INVENTOR
Halvor Gråsvoll
BY

INVENTOR
Halvor Gråsvoll
BY

United States Patent Office 3,130,839
Patented Apr. 28, 1964

3,130,839
LOADING APPARATUS
Halvor Gråsvoll, Rosengatan 1, Goteborg, Sweden, assignor of one-third each to Gustav Gilbert Magnusson and Karl Ingvar Weiner, both of Goteborg, Sweden
Filed May 31, 1962, Ser. No. 198,789
Claims priority, application Sweden June 6, 1961
4 Claims. (Cl. 214—6)

This invention has reference to a machine for moving articles from a conveyor to a load carrier or analogous device by means of lifting arms which move the articles past the upper end of a number of vertically extending strippers down over a load carrier of any kind and back again between the strippers while depositing the articles on the load carrier.

A previously known machine fulfilling the same purpose and described in the U.S. Patent No. 1,556,695 has arms swinging along an arc-shaped path and the articles are stripped from the lifting arms at a rather considerable height above a truck. When sheets are to be handled these will fall down in inclined position and become displaced relatively to each other, and in order to arrange them exactly above each other the strippers must every time a sheet is moved be swung against the sheet pile and thus arrange the sheets in the same. Such a loading machine could hardly be used for loading parcels or articles which are high and have a rather small bottom surface for the reason that such articles would fall down from the lifting arms because of the arms' being inclined so greatly during the loading movement.

The main purpose of the present invention is to overcome this drawback. The main feature of the invention comprises a lift grating which is vertically movable on a horizontally movable trolley carriage and which carries the lifting arms. Such a machine makes it possible also to perform the loading, i.e. the movement of the articles from the conveyor to the load carrier and vice versa, continuously and the loading operation does not have to be interrupted not even when the loaded carrier is replaced by an empty load carrier. The loading capacity of the machine will thereby be considerable. Further, the machine can be made rather small.

An example of a machine in accordance with the invention will now be described with reference to the accompanying partly diagrammatic drawings. In the drawings.

Figure 2:
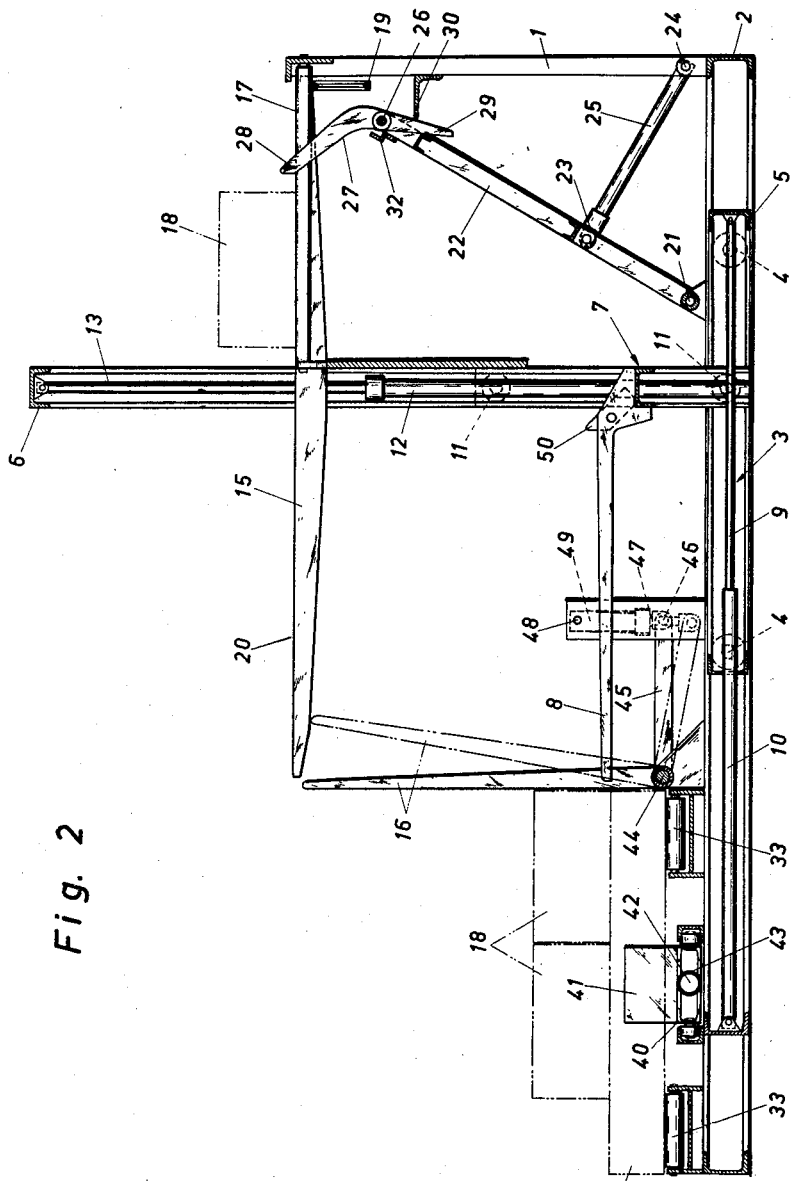
FIG. 2 shows a vertical section through the machine on the line II—II in FIG. 1 showing the movable parts of the machine in their initial position.

The stand 1 of the loading machine is provided with a bottom frame 2 of channel beams guiding a trolley carriage 3 with its rollers 4. The trolley carriage 3 is provided with a frame 5 having a vertically extending carrying stand 6 in which a lift carriage 7 is vertically movable by means of lifting arms 8 extending horizontally outwards from the lift carriage. The trolley carriage is horizontally movable by means of a piston 9 which is axially movable in a cylinder 10 connected to an hydraulic power source (not shown). The lift carriage 7 is guided with running wheels 11 in the carrying stand 6 and is provided with cylinders 12 connected to an hydraulic power source. The cylinders 12 are axially movable on each their pistons 13 journalled to the upper portion of the carrying stand 6. The stand 1 is on a certain level provided with a number of horizontal carrying rails 15 with spaces 14 between them, said rails 15 extending according to FIG. 2 with their free ends past the upper ends of a number of vertically extending strippers 16. Said rails 15 have their opposite ends attached to the stand 1 and here extend between the rollers 17 of the conveyor for feeding the articles 18 to the loading machine. The conveying rollers 17 are journalled in the stand 1 and are driven by means of a driven belt, preferably a driven cone belt 19, resting under friction against the underside of the rollers. The carrying rails 15 form with their floating portion to the left of the conveyor according to FIG. 2 an intermediate station 20 for the articles.

Figure 3:
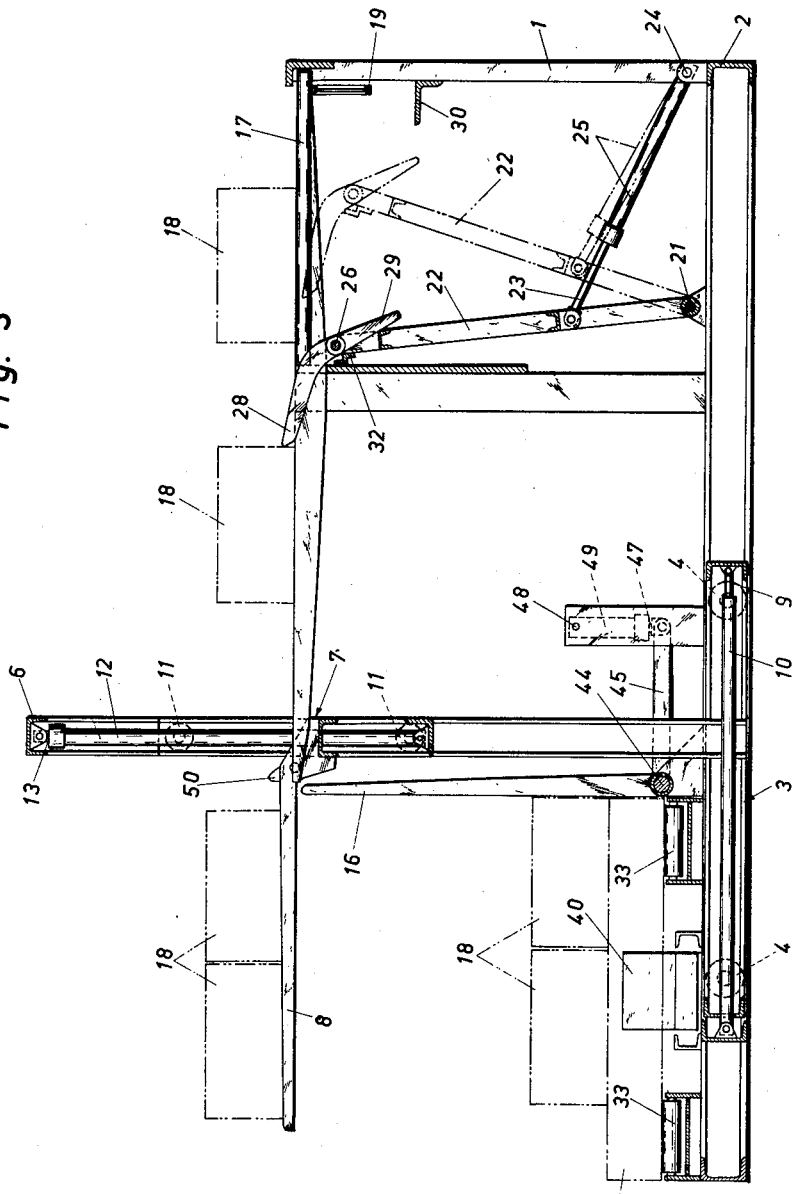
FIG. 3 shows a corresponding section showing the movable parts of the machine in another feeding position.
Figure 4:
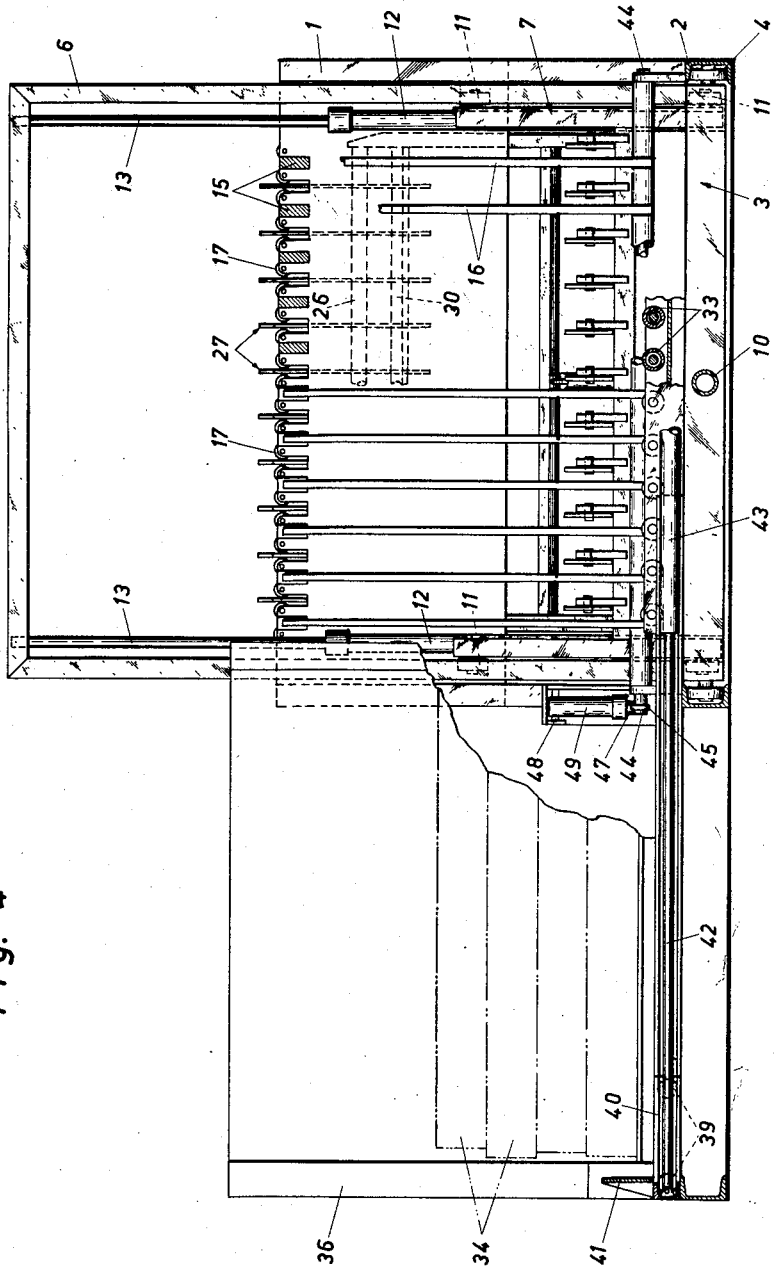
FIG. 4 shows a vertical section through the machine on the line IV—IV in FIG. 1.

The machine is below the conveyor rollers 17 provided with a feeding device for transporting the articles 18 from the conveyor to the intermediate station 20. This feeding device comprises a lever 22 being with its lower end journalled about a horizontal shaft 21, said lever 22 being axially movable in a cylinder 25 which is connected to an hydraulic power source and journalled in the stand 1 with one end about a bolt 24. At the upper end of the lever 22 there are about a horizontal shaft 26 journalled drivers 27 shaped as two-armed levers. The upper arm 28 can by abutment of its lower arm 29 against a stop flange 30 on the stand 1 be forced with the upper end to enter through the space 31 between the conveyor rollers 17. At the swinging in counter clockwise direction of the lever 22 according to FIGS. 2 and 3 the drivers 27 catch with their upper end the articles 18 and move them over to the intermediate station 20. At the return of the lever 22, the drivers 27 swing in counter clockwise direction about the shaft 26 due to the greater weight of the arm 28 and are stopped against a flange 32 on the lever 22 in such a position that the free ends of the arms 28 pass below the conveyor rollers 17 and thus do not prevent the feeding of the articles 18 on the conveyor.

Figure 1:
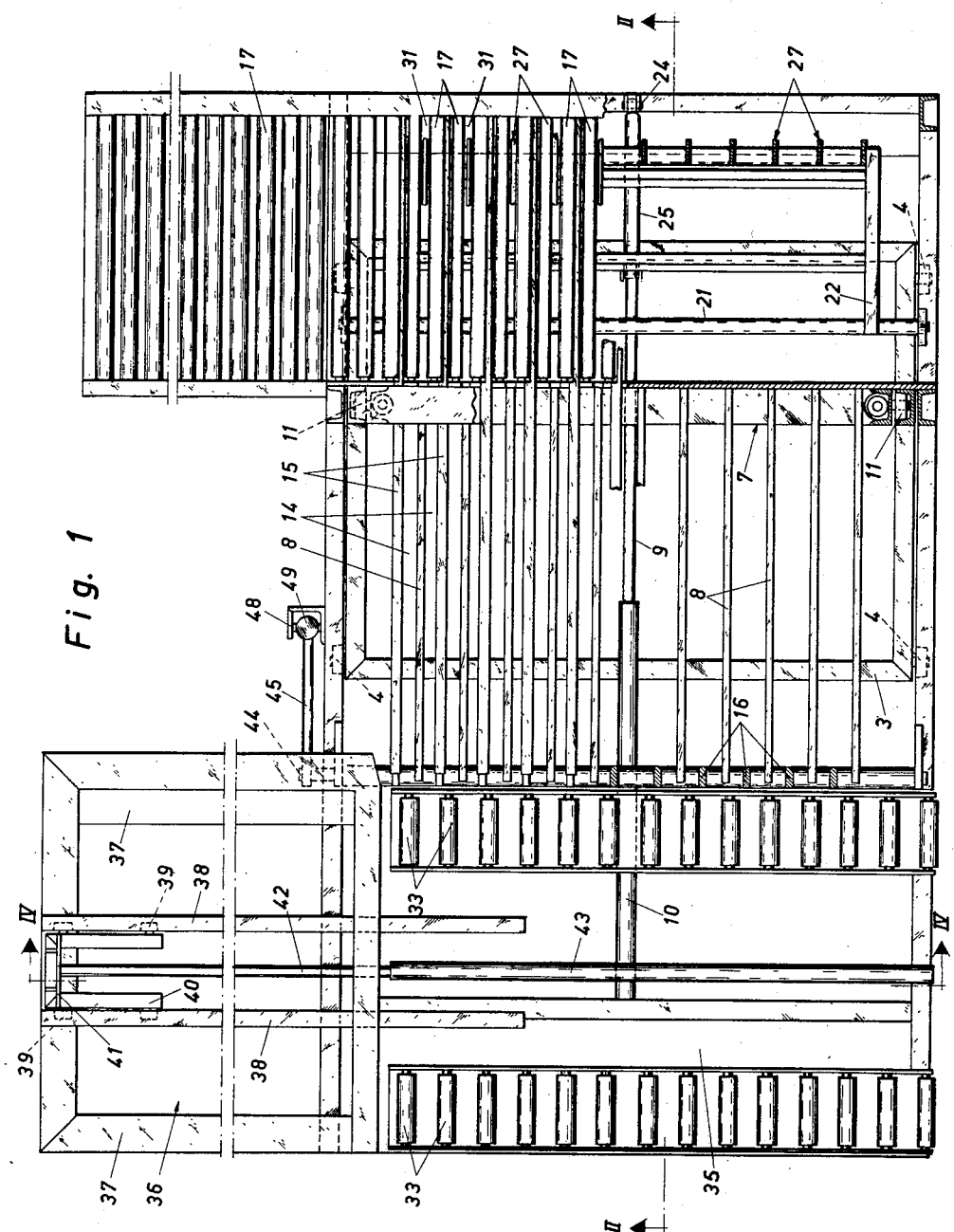
FIG. 1 is a plan view of a loading machine according to the invention.

To the left of the intermediate station 20 and the strippers 16 the machine is provided with two rows of conveyor rollers 33 for supporting the carrier 34 to be loaded. Behind the loading place 35 proper (FIG. 1) the machine is provided with a magazine 36 for empty carriers piled on each other. The lowermost load carrier rests with its side borders on carrying rails 37. Below the carrying rails there is a pushing carriage 40 horizontally movable along a running path 38 on running rollers 39 with a vertically extending driving sheet 41. The pushing carriage 40 is connected to a piston rod 42 which is axially movable in a cylinder 43 connected to an hydraulic power source. The magazine 36 also comprises a not shown hoisting device for lifting all load carriers with exception for the lowermost one resting on the carrying rails 37 when the load carrier 34 on the conveyor rollers 33 is charged and an empty load carrier is to be brought to the loading place 35.

Each of the respective lower ends of the strippers 16 are attached to a journalled, horizontal shaft 44. One end of a lever 45 is attached to said shaft 44, and the opposite end of said lever 45 is by means of a bolt 46 journalled to the outer end of a piston 47, axially movable in a cylinder 49 which is connected to an hydraulic power source and which with one end is journalled about a bolt 48. At the moving of the piston 47 out of the cylinder 49, the strippers 16 are swung in clockwise direction according to FIG. 2 in order to facilitate the removal of the charged load carrier from the loading place 35.

The hydraulic system with a pump, conduits, valves, pressure boxes and further devices has not been shown in the drawings as it is not of any essential importance for the present invention.

The loading is carried out in the following way. An empty load carrier 34 is situated at the loading place 35 and the articles 18 are fed on the conveyor in a single row. Further, it has been assumed that the trolley carriage 3 and the lift carriage 7 are in the position shown in FIG. 1. When the first row of articles is fed on the conveyor and on the same abuts against a stop (not shown in the drawings), a valve is opened in the feeding conduit to the cylinder 25 whereby pressure medium is pressed into this one and forces the piston 23 in the direction out of the cylinder. The lever 22 is swung in counter clockwise direction and the drivers 27 move the row of articles 18 arriving on the conveyor rollers 17 onto the intermediate station 20. The lever 22 returns to its original position (FIG. 2) and meanwhile a new row of articles 18 has arrived. The lever 22 is now swung again in counter clockwise direction and moves this other row of articles over to the intermediate station 20 whereas the row of articles already resting on the carrying rails 15 is moved further to the left against the free end of the carrying rails. Meanwhile the lift carriage 7 has been moved upwards as pressure fluid has been pressed into the cylinders 12. When the lifting arms 8 pass up through the spaces 14 between the carrying rails 15, the two rows of articles 18 are lifted from the carrying rails. Immediately thereupon pressure fluid is pressed into the cylinder 10 which causes the carriage 3 to be moved to the left according to FIG. 3 until the lifting arms with the rows of articles resting upon them are situated in front of the load carrier 34. The trolley carriage 3 stops here and the lift carriage 7 is lowered until the lifting arms 8 are situated just above the load carrier 34. The trolley carriage 3 is then moved back to the right to its original position whereas the articles are stripped from the lifting arms 8 by means of the strippers 16 since the lifting arms 8 pass through the spaces between the strippers. The lift carriage 7 is again lifted and when the lifting arms 8 reach the carrying rails 15, two rows of articles 18 have by means of the lever 22 and the drivers 27 been pushed onto the carrying rails 15. The articles 18 are moved in the way described in the aforegoing down over the load carrier 34 whereas the downwards movement of the lift carriage this time is stopped just above the articles 18 already placed on the load carrier 34. The loading operation is continued in this way until the loading of the carrier 34 is finished. The pushing wagon 40 is then brought to action and feeds an empty load carrier into the loading place 35 whereas the fully charged load carrier 34 is moved away on the rollers 33. Just before the action of the pushing wagon 40, pressure fluid is pressed into the cylinder 49 which causes a moving of the piston 47 in the direction out of said cylinder for swinging the strippers 15 in clockwise direction according to FIG. 2. Thus, they do not prevent the movement of the fully charged loading carrier away from the loading place 35. When the empty load carrier has been moved to the loading position, the strippers 16 return to their erected position and also the pushing wagon returns to its original position (shown in FIG. 1).

When the articles 18 comprise e.g. cardboard boxes it is—as shown in the drawings—advisable to provide the lift carriage 7 between the lifting arms 8 with drivers 50 so constructed that they extend up above the carrying rails 15 and boxes are fed out on the carrying rails, the drivers 50 by the boxes are swung down in such a way that they can slide on them. When the trolley carriage 3 thereupon is moved to the left according to FIG. 2, the drivers 50 enter behind the boxes and bring them together with the lifting arms 8 over to the load carrier 34.

It is quite obvious that the conveyance of articles from the conveyor can be carried out regardless of the exchange of load carriers. It is also quite clear that the change of load carriers can be performed without disturbance during the period when the lift carriage 7 performs a moving cycle. The exchange of load carrier should be started just when the upper layer of articles 18 has been stripped away from the lifting arms 8.

When the conveyor is arranged in such a way that on the same can simultaneously be fed two or more rows of articles 18, the feeding device below the conveyor rollers 17 can be completely omitted. In such a case the conveyor can feed the articles directly upon the carrying rails 15 wherefrom the articles are fed to the load carrier 34 by the lift carriage 7.

The present invention has been described in detail above for purposes of illustration only and is not intended to be limited by this description or otherwise except as defined in the appended claims. Other driving means and movement transmitting means than the ones shown in the drawings for the movement of the trolley carriage 3 and the lifting carriage 7 could of course be used. The different impulses to the valves for control of the fluid flow to the cylinders 10, 12, 25, 43, and 49 are given preferably electrically via closing position breakers and relays. The circuit diagram of the electrical circuits has not been shown because it is considered as unnecessary for the explanation of the invention. It is of course possible to construct the device in such a way that the carrying rails 15 can simultaneously carry three or more rows of articles.

What I claim is:

1. A machine for transferring articles from a conveyor roll track to a pallet comprising a frame structure having a base carrying axially parallel rolls of the track; a plurality of rails between some of the respective rolls of the track and projecting horizontally and parallel therefrom to form a grated shelf-like platform; means for supporting the rails on the base at the zone of the platform adjacent the track to fix the position of the shelf-like platform, a carriage for travel substantially on the base in the direction of the axis of the rolls, said carriage having a stand; a plurality of bars carried on the stand and disposable between the rails and projecting horizontally away from the rolls to form an elevator platform on the stand; means for raising and lowering the elevator platform on the stand and with respect to the base, the limit of upward movement of the elevator platform being at least the height of the shelf-like platform so that the elevator platform can lift articles therefrom; pallet supporting means near the base and under the zone of movement of the elevator platform but from under the fixed shelf-like platform, generally vertically projecting stripper prongs mounted for turning in a common plane and between the bars of the elevator platform, the turning being about a line near the base of a pallet supporting means so as to turn to substantially vertical position and vertically aline articles on a pallet on the supporting means, the limit of movement of the carriage away from the conveyor being sufficiently great for the elevator platform to clear the shelf-like platform.

2. A machine as claimed in claim 1, and reciprocating claws between at least some of the rolls for pushing articles laterally from the conveyor track onto the shelf-like platform.

3. A machine as claimed in claim 1 said pallet supporting means being a roller track, the rolls of which are parallel with the rolls of the conveyor, and hydraulic means for pushing a pallet onto the supporting means.

4. A machine as claimed in claim 2 said claws being sufficiently long with respect to the rails and bars so that when the carriage is nearest the conveyor track, the claw will extend as far as the elevator platform.

References Cited in the file of this patent
UNITED STATES PATENTS

| | | |
|---|---|---|
| 944,946 | Clark | Dec. 28, 1909 |
| 1,556,695 | Kronborg | Oct. 13, 1925 |
| 2,397,720 | Beane | Apr. 2, 1946 |
| 2,536,882 | McDonald et al. | Jan. 2, 1951 |
| 3,080,069 | Euwe | Mar. 5, 1963 |